Aug. 26, 1941.                    H. VOLKS                    2,253,833
                              COOKING GRILL
                           Filed Dec. 4, 1939            3 Sheets-Sheet 1

Inventor.
Herbert Volks.
by Parker & Carter
Attorneys.

Aug. 26, 1941.               H. VOLKS                    2,253,833
                           COOKING GRILL
                        Filed Dec. 4, 1939            3 Sheets-Sheet 2
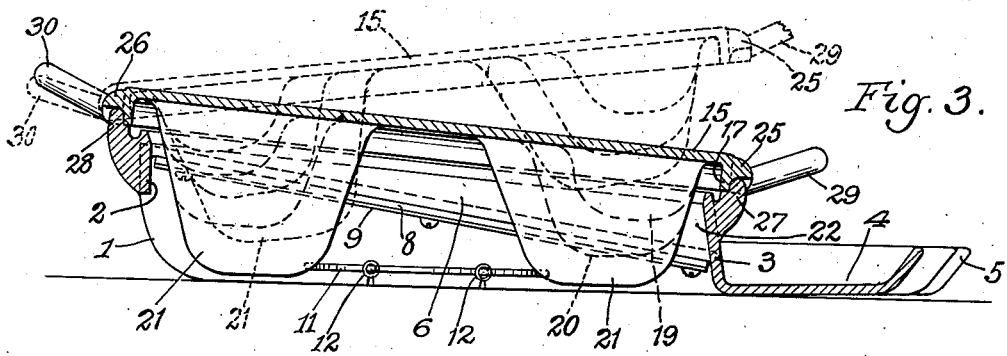
Fig. 3.
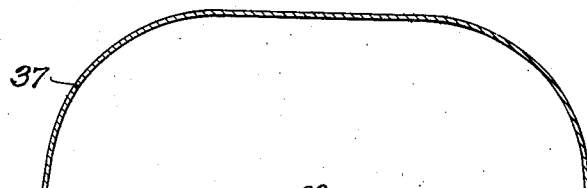
Fig. 4.
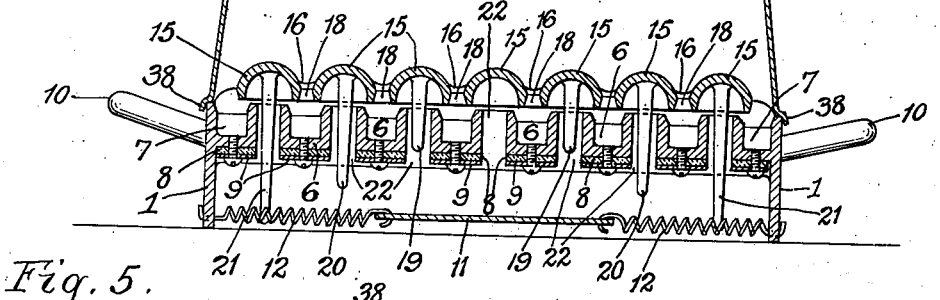
Fig. 5.
Fig. 6.
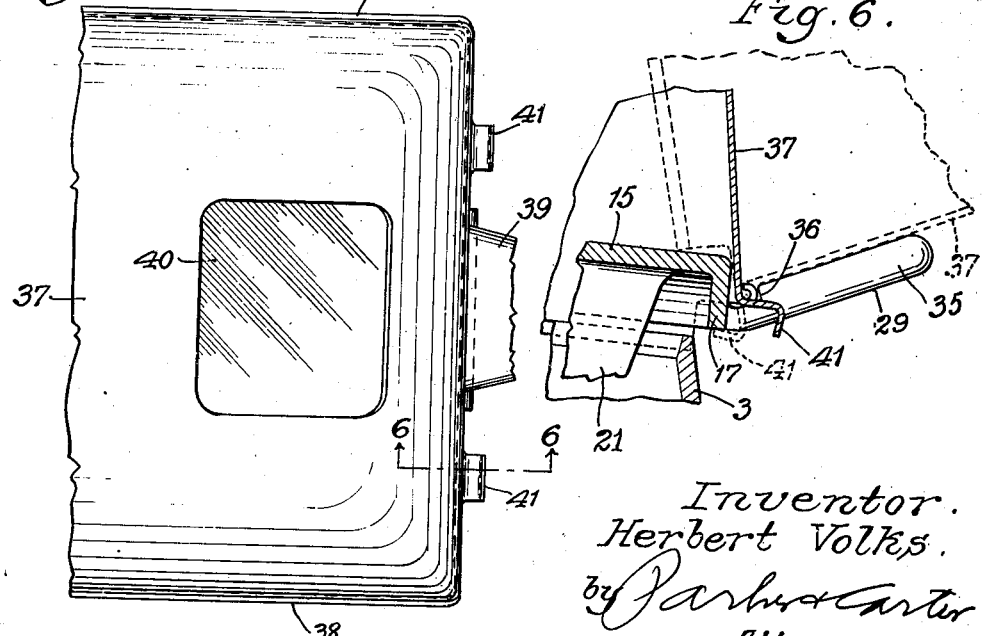
Inventor.
Herbert Volks.
by Parker & Carter
Attorneys.

Aug. 26, 1941.    H. VOLKS    2,253,833
COOKING GRILL
Filed Dec. 4, 1939    3 Sheets-Sheet 3
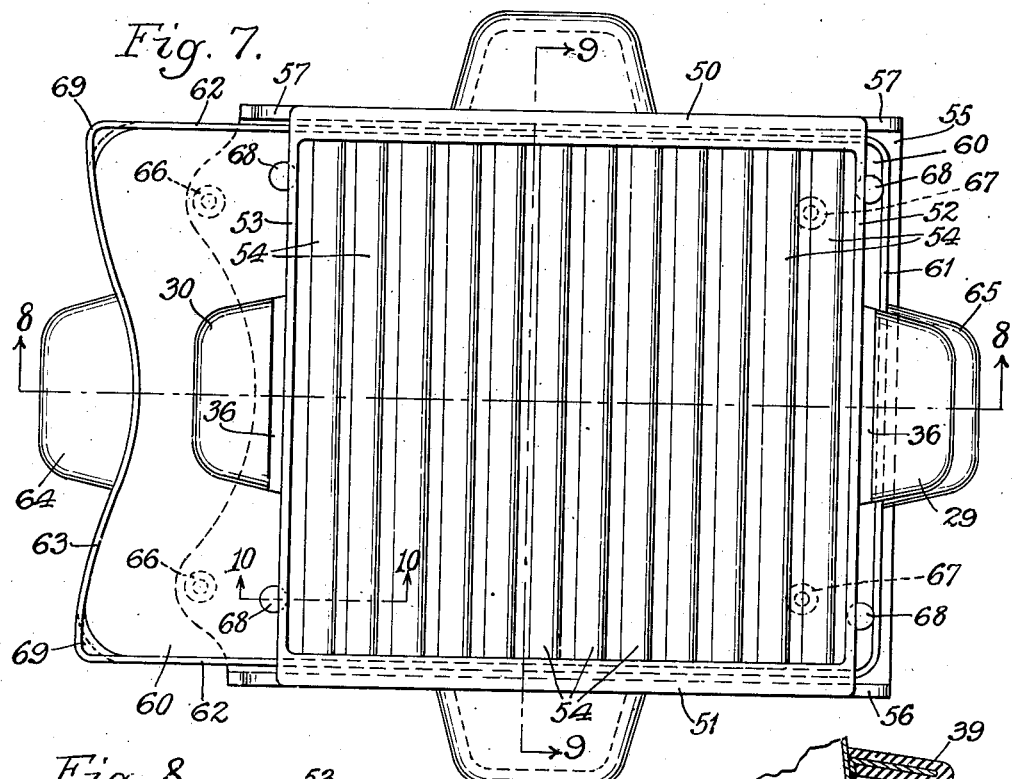
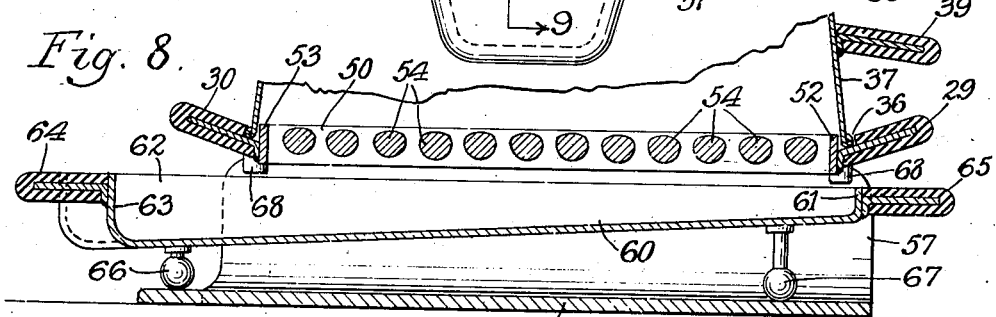
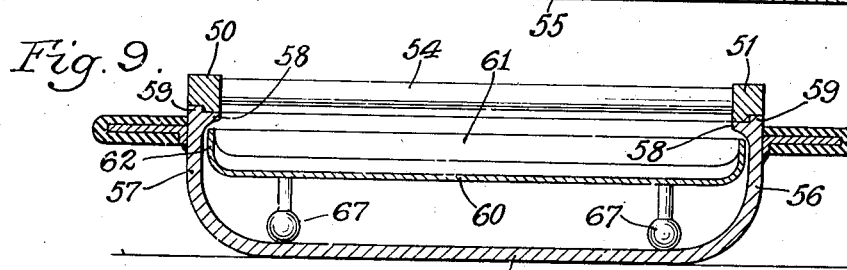
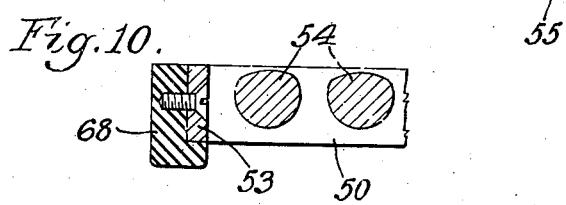
Inventor.
Herbert Volks.
by Herbert Carter
Attorneys.

Patented Aug. 26, 1941

2,253,833

UNITED STATES PATENT OFFICE 2,253,833

COOKING GRILL

Herbert Volks, Zurich, Switzerland, assignor to Sulzer Freres, Societe Anonyme, (also known as Sulzer Bros. Ltd.), Winterthur, Switzerland, a corporation of Switzerland Application December 4, 1939, Serial No. 307,358

13 Claims. (Cl. 53—5)

My invention relates to improvements in cooking grills and apparatus and process for cooking meat and the like, and has for one object to provide a grill which may be heated by any suitable means—gas, electricity, wood, or coal as the case may be—and which will grill and cook especially, lean meat. Another object of my invention is to provide means whereby grease, fat, or other juices may be carried away from the meat, be collected and concentrated, and will at the same time be protected from the maximum heat of cooking, whereby smoking will be obviated or minimized. Another object is to provide a grill which may be conveniently pre-heated before the cooking takes place. Another object is to provide a grill, or meat supporting member, which will retain a high degree of residual heat, and may, therefore, be removed from the heat, or stove, and brought to the table so as to keep the meat hot.

Other objects of my invention will appear from time to time in the specification and claims.

My invention is illustrated more or less diagrammatically in the accompanying drawings, wherein:

Figure 3 is a section along the line 3—3 of Figure 1.

Figure 4 is a section along the line 4—4 of Figure 2.

Figure 5 is a plan view of part of the cover.

Figure 6 is a section along the line 6—6 of Figure 5 on an enlarged scale.

Figure 7 is a plan view of a modified form of the grill.

Figure 8 is a section along the line 8—8 of Figure 7.

Figure 9 is a section along the line 9—9 of Figure 7.

Figure 10 is a section on a slightly enlarged scale along the line 10—10 of Figure 7.

Like parts are indicated by like characters in all figures.

Referring first to the device shown in Figures 1 to 5 inclusive, 1—1 are the side walls and 2 is the back wall of an open grill supporting frame. 3 is the front wall which carries the grease well, or cup, 4 extending clear across the front of the grill and having upwardly extending flanges and pouring lips 5.

Figure 2:
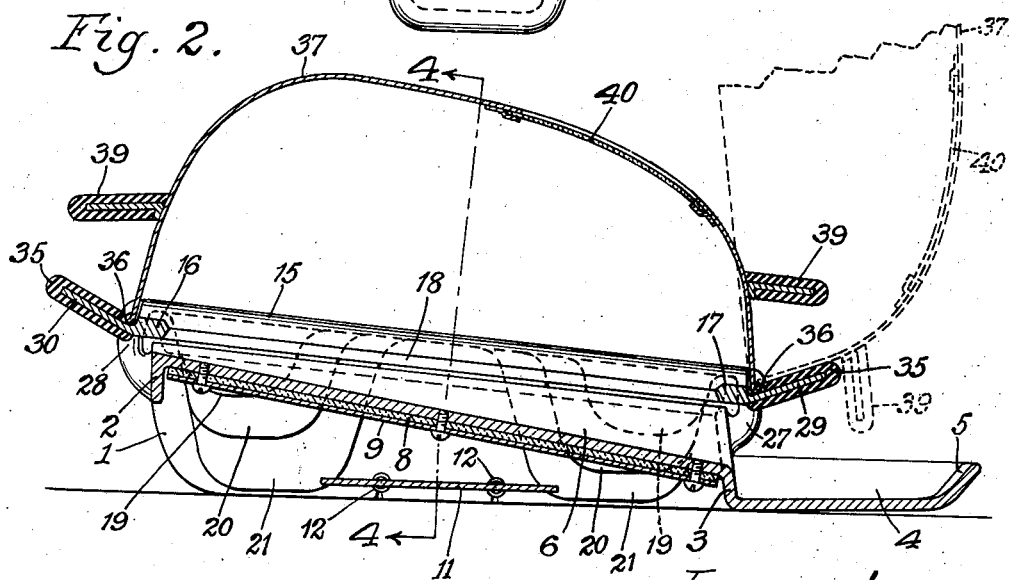
Figure 2 is a section along the line 2—2 of Figure 1.

Joined at their ends to the back wall and the front wall are a series of spaced, upwardly open channel members 6. These members are supported at their ends only. At both sides of the grill are additional channel members 7—7 bounded on the one side by walls 1—1. All these channel members 6 and 7 are downwardly inclined from the back wall 2 to the front wall 3 and discharge without obstruction into the grease well 4. 8—8 are insulating plates extending longitudinally along the channel members 6 and 7, and are held in place on the bottoms of these members and protected by the metallic supporting plates 9. 10—10 are handles extending outwardly from the side walls 1—1, and they may, if desired, be insulated in any suitable manner. 11 is a heat deflector, or baffle, plate baffling only a part of the area enclosed between the walls 1, 2 and 3, located and held in place in the center of such area by means of any suitable support, such as the springs 12. The arrangement of these springs and the baffle plate 11 being such that when the grill support rests on a plane surface as indicated in Figures 2, 3 and 4, the support engages the surfaces only at the bottom edges of the walls 1 and 3. The main portion of the grease well 4 and the baffle and its supports being preferably out of contact with the plane surface.

Figure 1:
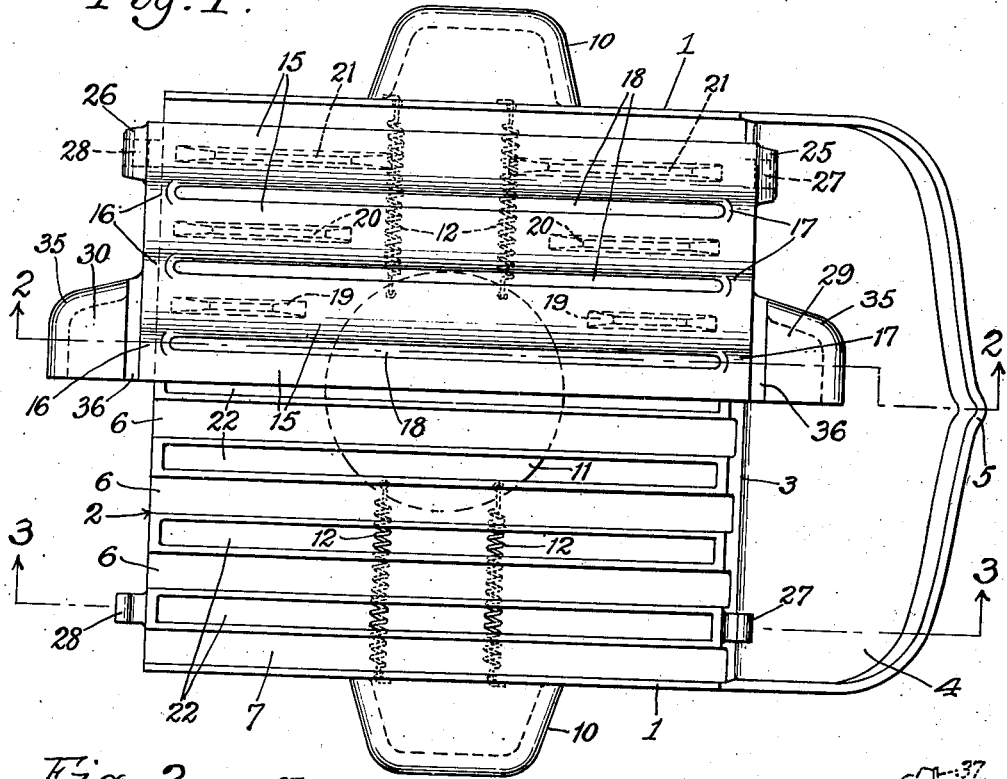
Figure 1 is a plan view with parts omitted of one form of my grill.

The grill upon which the food to be cooked is adapted to be removably mounted on the supporting frame, and comprises a plurality of parallel curved channel members 15, tied together at their ends by cross members 16 and 17, there being open slots 18 between the channel members 15 in register with the open channel members 6, the outermost edges of the members 15 overhang the channels 7. Downwardly depending from the channel members 15 are flanges 19, 20, and 21. These flanges increase in depth from from the center of the grill laterally and outwardly as indicated in Figures 2 and 4, and increase also in length from the center outwardly as indicated in Figures 1 and 2. These flanges project downwardly into and through the slots 22 between the channels 6 and 7. The meat, or other food, to be cooked is supported on the grill, and any fat, grease, or other juices will run down off the grill through the openings 18 into the channels 6 and 7, and thence downwardly into the grease well 4.

The grill proper is supported on the supporting framework, resting upon lugs 25 and 26 on the grill, engaging lugs 27 and 28 on the supporting frame so that the grill may be manipulated by means of the handles 29 and 30, as desired, to rotate the grill about either end, or to remove it altogether.

The baffle 11 is thus located in that part of the assembly where the heat conducting flanges are at a minimum.

As shown especially in Figure 2, the handles 29 and 30 are sheathed with insulating material as indicated at 35, and the insulating material terminates short of the body of the grill to leave channels 36. 37 is a cover, having flanged edges at 38 to overlie the members 1 and curled edges adapted to lie in channels 36. This cover has handles 39 downwardly inclined and so spaced and positioned with respect to the handles 29 and 30 that the cover may be rotated from closed to open position as shown at the right-hand side of that figure, in which case the two handles will interlock to assist in supporting and maintaining the cover in position, or the cover may be rotated in the opposite direction, if desired, or may be removed completely. The dotted lines in Figures 3 show how the grill itself may be rotated, or manipulated. 40 is a window in the cover 37 through which the process of cooking may, if desired, be watched. 41 is a hook on the body of the cover, which, when the cover is rotated into open position, as shown in Figures 2 and 6, hooks under the wall 16 to hold the cover against excessive displacement as indicated.

The preferred method of using the grill will be to first place the grill itself, that is, that part of the grill that is going to support the meat, upon the fire of heat element, in the reversed position, that is to say, the round surfaces which are to support the heat will be exposed directly to the flame, or heat, until the grill is thoroughly heated to maximum temperature. Then the grill will be reversed and placed upon the support, the support will then be placed upon the fire, the meat will be placed on the grill and the cover be put in place. For cooking the fire will then be turned lower than for heating the grill and constant, generally uniform heat will be maintained by the heat flow from the fire to and through the flanges 19, 20 and 21. Because the fire is hottest at the center, the baffle 11 to some extent protects the flange 19. Because the fire is coolest towards the edges, the flanges, or webs, 21 extend down further than do the flanges, or webs, 20 and 19. The result is an even flow of heat to the entire grill, thus accomplishing the constant, uniform heating effect.

In the modified form, shown in Figures 7 and 10 inclusive, the cover arrangement is the same as previously described, and so no specific description of that is needed in connection with these figures.

50 and 51 are side bars of the grill. 52 and 53 are end bars of the grill. 54—54 are generally round grill bars extending between the side bars 50 and 51, adapted to support the meat, or material, to be cooked and leaving sufficiently wide spaces between them for the escape of fat, meat juices and the like. This grill may be of cast iron, aluminum, or other metal as the case may be. 55 is a supporting channel, or base, having two parallel side walls 56 and 57, flanged at 58, having ribs at 59 to interlock with ribs on the side walls 50 and 51 when properly positioned on the base. The base member 55 is open at both ends, and is preferably of aluminum or some similarly good heat conductor. The cover 37 rests on the grill just as is shown in Figure 2. 60 is a grease tray, which has peripheral flanges 61, 62, and 63, and is longer than the width of the grill. 64 and 65 are handles on the tray. 66 and 67 are insulated feet, adapted to support the tray 60 on member 55. 68—68 are insulated feet, depending downwardly from the grill. As indicated in Figures 10, these feet are insulating members so that a hot grill may be placed on a surface without damaging it, and without loss of heat from the grill. The grease tray 60 is provided with pouring lips 69 at opposed corners.

The device in Figures 7 to 10 inclusive, is used by first placing the grill upside down with the meat supporting surface directly exposed to the heat of the fire until the grill is heated to the maximum temperature. At the same time, or subsequently, the supporting member 55 will be placed on the fire and heated. As soon as the grill has been brought to the maximum temperature, it will be reversed and placed on the supporting member 55, interlocking therewith as indicated in Figure 9. The meat, or material to be cooked, will be placed on the grill and the cover will be put in place, and the grease tray will be placed in the space below the grill above the supporting member 55. The cooking will be done partly by the residual heat stored in the mass of the grill, and partly by heat transferred through the relatively thick, heavy walls of the supporting member 55. The area below the grill and below the supporting member 55 will be of somewhat lower temperature. The grease tray being insulated will remain relatively cool so that grease, or other liquids, that drop down from the meat on the grill will be caught in the grease tray and will run down the inclined surface in the grease well adjacent to the pouring lips, thus the grease will be maintained at a sufficiently low temperature to prevent vaporization and smoking.

The hooks 41 are located both at the front and rear of the cover 37 so that it may be lifted straight up or rotated forwardly or rotated backwardly as the case may be. It is a convenience that the handles interlock. They do not have to.

In Figures 9 and 7, the base 55 has handles 75 which are insulated as indicated.

I have referred to grease in connection with the grease well 4 and the tray 60 for instance, but it will be understood that this word is used in its generic sense as referring to anything that drips off the meat or other food in a more or less liquid or fluid form during the cooking operation.

I claim:

1. A grill for cooking meat and the like comprising a supporting frame, having a plurality of parallel downwardly inclined grease channels, a grease well at the lower ends of and adapted to receive grease from the channels, there being open slots between adjacent channels, a meat supporting grill member mounted on the frame, a plurality of open slots in register with the channels on the supporting frame and meat supporting members overlying the slots between the channels, and heat conducting webs depending downwardly from the grill through the slots in the supporting frame to terminate below the grease channels.

2. A grill for cooking meat and the like comprising a supporting frame, having a plurality of parallel downwardly inclined grease channels, a grease well at the lower ends of and adapted to receive grease from the channels, there being open slots between adjacent channels, a meat supporting grill member mounted on the frame, a plurality of open slots in register with the channels on the supporting frame and meat supporting members overlying the slots between the channels, heat conducting webs depending downwardly from the grill through the slots in the supporting frame to terminate below the grease channels, and throughout their entire area out of contact with the frame.

3. A grill for cooking meat and the like comprising a supporting frame, having a plurality of parallel downwardly inclined grease channels, a grease well at the lower ends of and adapted to receive grease from the channels, there being open slots between adjacent channels, a meat supporting grill member mounted on the frame, a plurality of open slots in register with the channels on the supporting frame and meat supporting members overlying the slots between the channels, heat conducting webs depending downwardly from the grill through the slots in the supporting frame to terminate below the grease channels, and throughout their entire area out of contact with the frame, and a baffle plate supported by the frame below the heat conducting webs and the channels, the webs being of maximum width where not masked by the baffle.

4. A grill for cooking meat and the like comprising a supporting frame, a meat supporting grill mounted on the frame for pivotal movement with respect to the frame about its two opposed ends, a cover mounted for pivotal movement about its two opposed ends on and adjacent the pivot supports of the meat supporting grill.

5. A grill for cooking meat and the like comprising a supporting frame, a meat supporting grill mounted on the frame for pivotal movement with respect to the frame about its two opposed ends, a cover and means interlocking with it and the meat supporting grill for limiting the opening pivotal movement of the cover and holding it in the opened position.

6. A grill for cooking meat and the like comprising a supporting frame, a meat supporting grill mounted on the frame for pivotal movement with respect to the frame about its two opposed ends, a cover and means interlocking with it and the meat supporting grill for limiting the opening pivotal movement of the cover and holding it in the opened position, the said means including interlocking handles on the cover and grill.

7. A grill for cooking meat and the like comprising a supporting frame, a meat supporting grill mounted on the frame for pivotal movement with respect to the frame about its two opposed ends, a cover and means interlocking with it and the meat supporting grill for limiting the opening pivotal movement of the cover and holding it in the opened position, the said means including interlocking handles on the cover and grill, and a hook adapted to interlock with the grill only when the cover is rotated to open position.

8. A grill including a supporting frame open at the top and closed at the bottom, a meat supporting grid adapted to interlock with, rest upon and close the open top of the frame, and a grease tray adapted to be removably positioned within the supporting frame between the bottom thereof and the grid.

9. A grill including a supporting frame open at the top and closed at the bottom, a meat supporting grid adapted to interlock with, rest upon and close the open top of the frame, and a grease tray adapted to be removably positioned within the supporting frame between the bottom thereof and the grid, and insulating means for supporting the tray within the spaces between the grid and the frame and maintaining it out of contact with both.

10. A grill including a supporting frame open at the top and closed at the bottom, a meat supporting grid adapted to interlock with, rest upon and close the open top of the frame, and a grease tray adapted to be removably positioned within the supporting frame between the bottom thereof and the grid, the grid including side members adapted to overlie and engage the walls of the supporting frame, and grid bars extending transversely of the frame between the side members.

11. A grill including a supporting frame open at the top and closed at the bottom, a meat supporting grid adapted to interlock with, rest upon and close the open top of the frame, and a grease tray adapted to be removably positioned within the supporting frame between the bottom thereof and the grid, the tray being longer than the supporting member and adapted to project beyond one end of the member and the grid, supporting legs on the tray adapted to maintain it in a substantially horizontal position upon the supporting frame, with the floor of the tray downwardly inclined toward that part thereof which extends beyond the grid and the supporting frame.

12. A grill including a supporting frame open at the top and closed at the bottom, a meat supporting grid adapted to interlock with, rest upon and close the open top of the frame, and a grease tray adapted to be removably positioned within the supporting frame between the bottom thereof and the grid, the tray having a downwardly inclined floor defining a grease receptacle at the lower end thereof, and supporting means for the tray adapted to position the grease receptacle outside of the area defined by the grid and the support.

13. A grill including a supporting frame open at the top and closed at the bottom, a meat supporting grid adapted to interlock with, rest upon and close the open top of the frame, and a grease tray adapted to be removably positioned within the supporting frame between the bottom thereof and the grid, the tray having a downwardly inclined floor defining a grease receptacle at the lower end thereof, and supporting means for the tray adapted to position the grease receptacle outside of the area defined by the grid and the support, and handles for the tray and a pouring lip adjacent one of the handles.

HERBERT VOLKS.